United States Patent [19]

Naar et al.

[11] Patent Number: 4,994,510
[45] Date of Patent: Feb. 19, 1991

[54] POLY(CARBONATE-SILOXANE) WITH REDUCED TENDENCY TO BURN

[75] Inventors: Raymond Z. Naar, Delmar, N.Y.; Edward N. Peters, Lenox, Mass.

[73] Assignee: General Electric Company, Pittsfield, Mass.

[21] Appl. No.: 505,333

[22] Filed: Apr. 5, 1990

[51] Int. Cl.$^5$ ................................................ C08K 5/13
[52] U.S. Cl. ..................................... 524/162; 524/161; 525/464
[58] Field of Search .................. 524/162, 161; 525/464

[56] References Cited

U.S. PATENT DOCUMENTS

| | | |
|---|---|---|
| 3,909,490 | 9/1975 | Mark ..................... 524/160 |
| 3,916,033 | 10/1975 | Merrill ................... 525/464 |
| 3,917,559 | 11/1975 | Mark . |
| 3,919,167 | 11/1975 | Mark . |
| 3,926,908 | 12/1975 | Mark . |
| 3,931,100 | 1/1976 | Mark . |
| 3,940,366 | 2/1976 | Mark ..................... 524/164 |
| 3,948,851 | 4/1976 | Mark ..................... 524/163 |
| 3,951,910 | 4/1976 | Mark . |
| 3,953,396 | 4/1976 | Mark . |
| 3,953,399 | 4/1976 | Mark . |
| 3,971,756 | 7/1976 | Bialous et al. . |
| 3,978,024 | 8/1976 | Mark . |
| 4,001,175 | 1/1977 | Mark . |
| 4,007,155 | 2/1977 | Mark . |
| 4,039,509 | 8/1977 | Mark . |
| 4,064,101 | 12/1977 | Mark . |
| 4,066,618 | 1/1978 | Mark . |
| 4,067,846 | 1/1978 | Mark . |
| 4,069,201 | 1/1978 | Mark . |
| 4,073,768 | 2/1978 | Mark . |
| 4,075,164 | 2/1978 | Mark . |
| 4,092,291 | 5/1978 | Mark . |
| 4,093,589 | 6/1978 | Factor et al. . |
| 4,093,590 | 6/1978 | Mark . |
| 4,600,632 | 7/1986 | Paul ..................... 525/464 |
| 4,616,042 | 10/1986 | Avakian ................. 525/464 |

Primary Examiner—Morton Foelak
Attorney, Agent, or Firm—Spencer D. Conard

[57] ABSTRACT

Poly(carbonate-siloxane) copolymers having reduced tendencies to burn are provided by the addition of an aromatic sulfone sulfonate thereto. These materials find utility in electrical applications.

5 Claims, No Drawings

POLY(CARBONATE-SILOXANE) WITH REDUCED TENDENCY TO BURN

BACKGROUND OF THE INVENTION

1. Field of the Invention

The present invention relates to poly(carbonate-siloxane) resin compositions and more particularly relates to poly(carbonate-siloxane) resin compositions having reduced tendencies to burn.

2. Description of Related Art

Poly(carbonate-siloxane) copolymers are known elastomeric materials and blends of poly(carbonate-siloxane) copolymers with thermoplastic resins such as polyesters and polycarbonates are known (See, for example, Avakian, U.S. Pat. No. 4,616,042). While the aforementioned poly(carbonate-siloxane) copolymers and blends have useful properties such as high yield elongations, these copolymers and blends typically exhibit flame test burning levels which are above those desired for particular electrical and aerospace applications.

While polycarbonate compositions have been rendered flame resistant by the incorporation of an aromatic sulfone sulfonate, (See, for example, Mark, U.S. Pat. No. 4,092,291) these compositions have lacked the desired level of elasticity and/or flexibility necessary for many electrical wiring applications such as wire and cable insulation. Polycarbonate-siloxanes, on the other hand, while possessing the required level of elasticity, have a tendency to degrade at elevated temperatures in the presence of alkalis such as the aforementioned sulfone-sulfonate and one would expect reduced molecular weight materials to exhibit an increased tendency to burn.

Accordingly, one obJect of the present invention is to provide poly(carbonate-siloxane) resin compositions having reduced tendencies to burn and exhibiting high levels of elasticity.

SUMMARY OF THE INVENTION

The present invention involves poly(carbonate-siloxane) resin compositions having an alkali metal salt of an aromatic sulfone sulfonate included therein and exhibiting reduced tendencies to burn.

DESCRIPTION OF THE INVENTION

The polysiloxane-polycarbonate block copolymers can be expressed by the average formula:

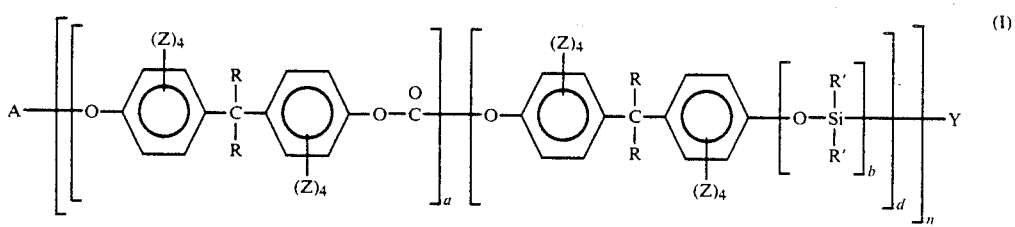

where n is at least 1, and preferably n is an integer equal to from 1 to about 1.000, inclusive, a is equal to from to about 200, inclusive, b is equal to from about 5 to about 200, inclusive, and preferably b has an average value from about 15 to about 90, inclusive, the ratio of a to b can vary from about 0.05 to about 3, inclusive, but when b has an average value of from about 15 to about 90, inclusive, the ratio of a to b is preferably from about 0.067 to about 0.45, inclusive, d is 1 or more, Y is

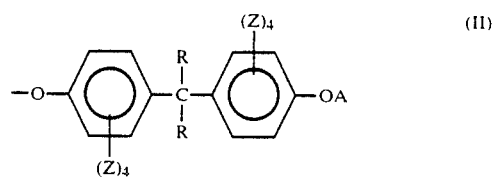

A is a member selected from the class of hydrogen and

R is a member selected from the class of hydrogen, monovalent hydrocarbon radicals and halogenated monovalent hydrocarbon radicals. R' is a member selected from the class of monovalent hydrocarbon radicals, halogenated monovalent hydrocarbon radicals and cyanoalkyl radicals. R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, R is preferably methyl. R' includes all radicals included by R above except hydrogen, where R' can also be all the same radical or any two or more of the aforementioned R radicals except hydrogen, and R' is preferably methyl. R' includes all radicals included by R above except hydrogen, where R' can also be all the same radical or any two or more of the aforementioned R radicals except hydrogen, cyanoalkyl radicals such as cyanoethyl, cyanobutyl, etc. radicals. Radicals that are included within the definition of Z are hydrogen. methyl, ethyl, propyl, chloro, bromo, iodo, etc. and combinations thereof, and Z is preferably hydrogen.

The copolymers of the present invention can be further described as comprising recurring copolymeric units of a polydiorganosiloxane Joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40% to 70% by weight.

The above copolymers can be produced by reacting at temperatures in the range of 0° C. to 100° C. preferably 20° C. to 50° C. and in the presence of an acid accepter, a mixture of a halogen chain-stopped polydiorganosiloxane having the formula

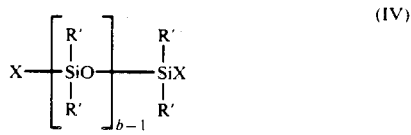
(IV)

and a dihydric phenol having the formula

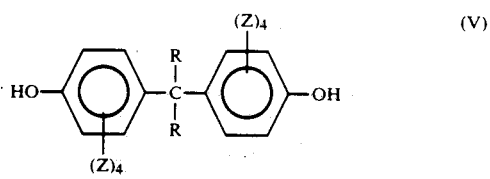
(V)

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes can be made by conventional procedures such as by the controlled hydrolysis of a diorganodihalosilane, for example, dimethyldichlorosilane as taught in Patnode, U.S. Pat. No. 2,381,366 and Hyde, U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer, U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4% to about 35% by weight, and preferably from about 1% to about 10% by weight of said halogen chain-stopped polysiloxane. The halogen chain-stopped polysiloxane is preferably in the form of a chlorinated polydimethyl-siloxane.

Dihydric phenols that are included are, for example, 2.2-bis(4-hydroxyphenol)propane (bisphenol (A); 2.4'-dihydroxydiphenylmethane; bis(2-hydroxyphenyl)methane; bis-(4 hydroxyphenyl)methane; 1.1-bis(4-hydroxyphenyl)ethane; 1.2-bis(4-hydroxyphenyl)ethane; 1.1-bis(4-hydroxy-2-chlorophenyl)ethane; 1.1-bis(2.5-dimethyl-4-hydroxyphenyl)ethane; 1.3-bis(3-methyl-4-hydroxyphenyl)propane. 2,2-bis(3-isopropyl-4-hydroxyphenyl)propane; etc. Mixtures can also be used. Others will occur to those skilled in the art.

These copolymers essentially comprise recurring units consisting of a polydiorganosiloxane interconnected by substituted aryloxy-silicone linkages to a polyester of carbonic acid precursor and a dihydric phenol.

Materials of the above nature are also described in U.S. Pat. Nos. 3,189,662 and 3,821,325 included herein by reference and can be used either alone as such or in conJunction with well known modifiers to provide particular desired characteristics.

Illustrative of the above block copolymers is General Electric LR-3320. This materials has a specific gravity of 1.12, tensile strength of 2500 to 3900 psi, an elongation of 230–430, a tear strength (Die C) of 400 lbs/in., and a brittleness temperature below −76° F. and a heat deflection temperature (10 mils under 66 psi Load) of 160° F.

Another such block copolymer specifically General Electric LR-4020 has a refractive index of 1.506, a tensile strength of 1810 to 2290 psi, an elongation of 530–580%, and a brittleness temperature below −76° F.

The aromatic sulfone sulfonates for use in the resin compositions of the present invention include the metal salt of the monomeric aromatic sulfone sulfonate which can best be represented by the following formula:

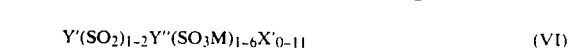
(VI)

wherein X' is an electron withdrawing radical, M is a metal which may be selected from the periodic table of either an alkali metal or an alkali earth metal, and Y' and Y" may be either an aryl radical of 1-2 aromatic rings or an aliphatic radical of 1-6 carbon atoms and they may be the same or different. It is to be understood, however, that Y' and Y" together must contain at least one aromatic ring to which the SO$_3$M group is attached.

The most preferred aromatic sulfone sulfonate is a potassium salt of diphenylsulfone-3-sulfonic acid which can be represented by the following formula:

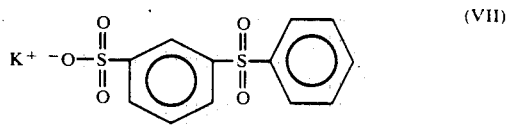
(VII)

The compositions of the present invention may further include amounts of rigid thermoplastic resins such as polycarbonate, polyestercarbonates and polyesters. The incorporation of an amount of the above rigid thermoplastic serves to increase the extended use temperature of the poly(carbonatesiloxane) composition.

The compositions may contain from 98% to 99.999% by weight poly(carbonate-siloxane) based on the total weight of the composition, preferably from 99.5% to 99.9% by weight thereof, and most preferably about 99.8% by weight thereof. If the composition contains a rigid thermoplastic resin along with the poly(carbonate-siloxane) then the composition contains from 60% to 95% by weight poly(carbonate-siloxane) resin based on the total weight of the composition, more preferably from 75% to 95% by weight thereof and most preferably about 80% by weight thereof; and the compositions preferably contain from 40% to 5% by weight of rigid thermoplastic resin based on the total weight of the composition, preferably from 25% to 5% by weight thereof, and most preferably about 20% by weight thereof. Preferably the compositions contain from 0.001% to 2.0% by weight of the composition, more preferably from 0.10% to 0.50% by weight thereof, and most preferably about 0.20% by weight thereof.

EXAMPLES

The following examples illustrate the present invention but are not meant to limit the scope thereof.

| Example | Composition | Time/Combustion (sec)[b] 1st Burn | Time/Combustion (sec)[b] 2nd Burn | TF (sec)[c] | Rating[d] |
|---|---|---|---|---|---|
| 1 | PCS[a] | 3 | 7 | 54 | V-1 |
|   |   | 3 | 7 |   |   |
|   |   | 3 | 6 |   |   |
|   |   | 4 | 6 |   |   |
|   |   | 3 | 9 |   |   |
| 2 | PCS[a] + 0.2% KSS[e] | 3 | 4 | 30 | V-0 |
|   |   | 2 | 4 |   |   |
|   |   | 2 | 3 |   |   |
|   |   | 3 | 3 |   |   |
|   |   | 2 | 4 |   |   |

[a] Poly(carbonate-siloxane) block copolymer (PSC) having 43% by weight siloxane units, also included 0.1% by weight of a phosphite for improved color.
[b] Time for combustion is in seconds as determined by standardized test UL Bulletin 94.
[c] TF = total flame of 1st and 2nd burn for 5 test samples as determined by standardized test UL Bulletin 94.
[d] Ratings are as set forth by standardized test UL Bulletin 94. V-0 is a superior rating to V-1.
[e] KSS is a monomeric potassium aromatic sulfone sulfonate as represented by the formula:

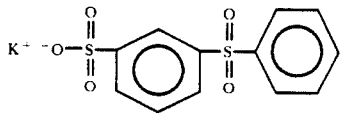

FOOTNOTE TO EXAMPLE

In the examples above, the molecular weight of the PCS was measured prior to, and after the incorporation of, the potassium sulfone sulfonate salt. The salt was compounded into the resin by dry blending and subsequent melt homogenization at a temperature of 575° F. The molecular weight was measured via solution viscometry. The results were as follows:

| PCS resin prior to incorporation | [n] = 0.78 dl/g |
|---|---|
| PCS + 0.2% KSS | [n] = 0.72 dl/g |

Thus, incorporation of KSS resulted in a measurable degradation of molecular weight of the resin; the reaction which occurs at the relatively high temperature required for melt processing will, of course, proceed at a faster rate at the much higher temperatures of an actual flame test. The corresponding low molecular degradation products would thus be expected to provide fuel for the flame, i.e., to make the system burn easier. This, of course, would *lower* the flammability rating of the system. Instead, surprisingly, the rating improved as shown by the example. It is notable that V-0 rating has been achieved at this rating also requires that the specimen not drip during combustion, and the lower the molecular weight, the "softer" the material and therefore the easier for it to drip.

What is claimed:
1. A flame resistant composition comprising:
   (a) from 60% to 99.999% by weight of a poly(carbonate-siloxane); and
   (b) from 0.001% to 2% by weight of an alkali metal salt of an aromatic sulfone sulfonate.
2. The composition of claim 1 wherein said aromatic sulfone sulfonate is of the general formula:

3. The composition of claim wherein said composition further comprises polybutylene terephthalate at a level of from 5% to 40% by weight based on the total weight of the resin.
4. A flame resistant composition consisting essentially of:
   (a) a poly(carbonate-siloxane); and
   (b) an alkali metal salt of an aromatic sulfone sulfonate.
5. The composition of claim 4 wherein said aromatic sulfone sulfonate is of the general formula:

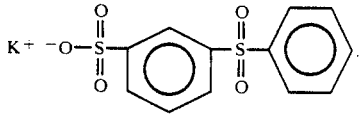

* * * * *